United States Patent
Turek et al.

(10) Patent No.: US 7,677,713 B2
(45) Date of Patent: Mar. 16, 2010

(54) SOLID INK SET INCORPORATING NATURALLY DERIVED MATERIALS AND PROCESSES THEREOF

(75) Inventors: Caroline M. Turek, Hamilton (CA); Marcel P. Breton, Mississauga (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 373 days.

(21) Appl. No.: 11/755,344

(22) Filed: May 30, 2007

(65) Prior Publication Data

US 2008/0297556 A1 Dec. 4, 2008

(51) Int. Cl.
*C09D 11/00* (2006.01)
(52) U.S. Cl. ...................... 347/99; 106/31.13
(58) Field of Classification Search .................. 347/88, 347/99, 31.13; 106/31.13, 31.6
See application file for complete search history.

(56) References Cited

U.S. PATENT DOCUMENTS

| | | | |
|---|---|---|---|
| 4,390,369 A * | 6/1983 | Merritt et al. ............... 106/31.3 |
| 4,484,948 A | 11/1984 | Merritt et al. |
| 4,830,671 A | 5/1989 | Frihart et al. |
| 4,889,560 A | 12/1989 | Jaeger et al. |
| 4,889,761 A | 12/1989 | Titterington et al. |
| 5,122,187 A | 6/1992 | Schwarz et al. |
| 5,194,638 A | 3/1993 | Frihart et al. |
| 5,350,446 A * | 9/1994 | Lin et al. .................. 106/31.61 |
| 5,372,852 A | 12/1994 | Titterington et al. |
| 5,514,209 A | 5/1996 | Larson, Jr. |
| 5,592,204 A * | 1/1997 | Lin et al. ...................... 347/88 |
| 5,597,856 A | 1/1997 | Yu et al. |
| 5,750,604 A | 5/1998 | Banning et al. |
| 5,780,528 A | 7/1998 | Titterington et al. |
| 5,782,996 A | 7/1998 | Fan |
| 5,783,658 A | 7/1998 | Banning et al. |
| 5,827,918 A | 10/1998 | Titterington et al. |
| 5,830,942 A | 11/1998 | King et al. |
| 5,891,228 A * | 4/1999 | Baker et al. ............. 106/31.31 |
| 5,919,839 A | 7/1999 | Titterington et al. |
| 6,015,847 A | 1/2000 | Titterington et al. |
| 6,106,602 A * | 8/2000 | Ouchi et al. ............. 106/31.61 |
| 6,174,937 B1 | 1/2001 | Banning et al. |

(Continued)

FOREIGN PATENT DOCUMENTS

DE 198 34 964 A1 2/1999

(Continued)

*Primary Examiner*—Matthew Luu
*Assistant Examiner*—Rut Patel
(74) *Attorney, Agent, or Firm*—Oliff & Berridge, PLC (57) ABSTRACT

A solid phase change ink composition that includes an ink vehicle, a colorant, and at least one naturally derived material. At least one naturally derived material is a low melt material having an onset of melting from about 45° C. to about 120° C., and a melt transition width of from about 3° C. to about 30° C. Also provided is a method for producing a solid phase change ink composition that includes selecting at least one naturally derived material, forming an ink vehicle, and adding a colorant, wherein at least one naturally derived material is a low melt material having an onset of melting of from about 45° C. to about 120° C., and a melt transition width of from about 3° C. to about 30° C. An ink jet device that includes the solid phase change ink composition described in the present disclosure is also provided.

15 Claims, 2 Drawing Sheets

U.S. PATENT DOCUMENTS

| | | |
|---|---|---|
| 6,255,432 B1 | 7/2001 | Evans et al. |
| 6,309,453 B1 | 10/2001 | Banning et al. |
| 6,380,423 B2 | 4/2002 | Banning et al. |
| 6,464,766 B1 | 10/2002 | Banning et al. |
| 6,472,523 B1 | 10/2002 | Banning et al. |
| 6,476,219 B1 | 11/2002 | Duff et al. |
| 6,547,380 B2 | 4/2003 | Smith et al. |
| 6,576,747 B1 | 6/2003 | Carlini et al. |
| 6,576,748 B1 | 6/2003 | Carlini et al. |
| 6,590,082 B1 | 7/2003 | Banning et al. |
| 6,620,228 B1 | 9/2003 | King et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,835,238 B1 | 12/2004 | Wu et al. |
| 6,858,070 B1 | 2/2005 | Wong et al. |
| 6,860,930 B2 | 3/2005 | Wu et al. |
| 6,860,931 B2 | 3/2005 | Wu et al. |
| 6,906,118 B2 | 6/2005 | Goodbrand et al. |
| 6,958,406 B2 | 10/2005 | Banning et al. |

FOREIGN PATENT DOCUMENTS

| | | |
|---|---|---|
| EP | 0 739 958 A | 10/1996 |
| GB | A-2238792 | 6/1991 |
| GB | A-2290793 | 1/1996 |
| GB | A-2294939 | 5/1996 |
| GB | A-2305670 | 4/1997 |
| GB | A-2305928 | 4/1997 |
| JP | A-05-070722 | 3/1993 |
| WO | WO 94/14902 | 7/1994 |
| WO | WO 95/04760 | 2/1995 |
| WO | WO 96/14364 | 5/1996 |
| WO | WO 97/12003 | 4/1997 |
| WO | WO 97/13816 | 4/1997 |
| WO | WO 97/33943 | 9/1997 |
| WO | WO 98/30643 A | 7/1998 |
| WO | WO 2006/062523 A1 | 6/2006 |

* cited by examiner

FIG. 1

SOLID INK SET INCORPORATING NATURALLY DERIVED MATERIALS AND PROCESSES THEREOF

BACKGROUND

The present disclosure generally relates to solid phase change inks, particularly solid phase change ink jet ink compositions containing renewable resources, and the use of such inks in methods of forming images, particularly for use in inkjet printing.

The inks herein exhibit improved abrasion resistance, adhesion to paper, and improved fold characteristics with reduced environmental impact as compared to conventional inks.

REFERENCES

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand.

In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (that is, liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal inkjet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In general, phase change inks are in the solid phase at, for example, ambient or room temperature, such as about 20° C. to about 27° C., but exist in the liquid phase at the elevated operating temperature of an Inkjet printing device. At the jet operating temperature, the ink is molten and droplets of liquid ink are ejected from the printing device. When the ink droplets contact the surface of the recording substrate, either directly or via an intermediate heated transfer belt or drum, they quickly solidify to form a predetermined pattern of solidified ink drops.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to eighteen rotations (incremental movements) of a substrate (an image receiving member or intermediate transfer member) with respect to the ink jetting head, that is, there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers have a wax based ink vehicle, for example, a crystalline wax. Such solid ink jet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents show through on the paper.

In these systems, the crystalline wax inks are jetted onto a transfer member, for example, an aluminum drum, at temperatures of approximately 100° C.-140° C. The wax based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, for example, paper, the image comprised of wax based ink is pressed into the paper.

However, the use of crystalline waxes places limitations on the printed image. Conventional crystalline waxes are apolar aliphatic molecules bound together by weak van der Waals forces. These waxes have little natural affinity for the more polar paper substrate and due to the nature of their own intermolecular bonding are vulnerable to mechanical damage.

U.S. Pat. No. 6,906,118, incorporated herein by reference in its entirety, discloses phase change ink compositions wherein at a first temperature, hydrogen bonds of sufficient strength exist between the ink vehicle molecules so that the ink vehicle forms hydrogen bonded dimers, oligomers, or polymers, and wherein at a second temperature higher than the first temperature, the hydrogen bonds between the ink vehicle molecules are sufficiently broken that fewer hydrogen-bonded dimers, oligomers, or polymers are present in the ink so that the viscosity of the ink at the second temperature is lower than the viscosity of the ink at the first temperature.

While known compositions and processes are suitable for their intended purposes, a need remains for improvements in phase change inks, for example for solid phase change inks that comprise renewable resources. While present phase change inks may be petroleum based and produced from non-renewable resources, it is desirable to provide a solid phase change ink wherein a major proportion of the ink is derived from renewable resources, and is thus environmentally friendly.

SUMMARY

These and other improvements are accomplished by the inks described herein. For example, described herein are inks that provide additional cost savings and increase performance such as abrasion resistance, adhesion to paper, and improved fold characteristics, while delivering a positive environmental impact.

In embodiments, the solid phase change ink composition is comprised of an ink vehicle, a colorant, and at least one naturally derived material, wherein at least one naturally derived material is a low melt material having an onset of melting from about 45° C. to about 120° C., such as from about 45° C. to about 90° C., and a melt transition width of from about 3° C. to about 30° C.

In embodiments, described is a method for producing a solid phase change ink composition comprising selecting at least one naturally derived material, forming an ink vehicle, and adding a colorant, wherein at least one naturally derived material is a low melt material having an onset of melting of from about 45° C. to about 120° C., such as from about 45° C. to about 90° C. and a melt transition of from about 3° C. to about 30° C.

In embodiments, described is a solid phase change ink jet device comprising at least one ink retaining reservoir holding a phase change ink, an ink jet head, and an ink supply line for providing the phase change ink to the ink jet head, wherein the phase change ink comprises an ink vehicle, a colorant, and at least one naturally derived material.

EMBODIMENTS

The solid phase change ink composition described herein incorporates naturally derived materials. A process for preparing such inks is also provided. In the present disclosure, for example, solid phase change ink is obtained by replacing about 20 to about 95 percent by weight, or more, of the vehicle components presently found in commercial solid ink products with naturally derived materials. Vehicle components is defined in this context to include all ink components except the colorant and the thermal stabilizer. These naturally derived materials are beneficial, for example, because they can be produced from renewable resources, rather than from limited resources such as petroleum products. As used herein, the term "renewable resources" includes, for example, naturally derived materials, such as bioresins.

In embodiments, any suitable naturally derived materials may be used, where the naturally derived materials generally replace the crystalline, semi-crystalline and/or amorphous components that are used in the present commercial solid ink, such as crystalline, semi-crystalline and/or amorphous components that are typically derived from petroleum-based products. In embodiments, the solid phase change ink composition includes at least one naturally derived material that is a low melt material, and may optionally include at least one higher melting naturally derived material, such as a naturally derived resin.

Certain naturally derived wax materials exhibit mechanical and thermal properties suitable for use in solid phase change ink compositions. For example, certain low melt wax-like naturally derived materials may exhibit sharp melting and solidification properties. Melt onset may occur at, for example, from about 45-120° C., such as from about 45° C. to about 90° C., such as about 60° C.; and the width of the melt transition maybe, for example, from about 3° C.-30° C., such as from about 5° C.-20° C., or such as from about 6° C.-15° C. Such materials may also exhibit good heat stability and strong adhesion to a number of substrates, including plain papers, coated substrates, and those materials comprised of thermoplastic resins. Exemplary naturally derived wax materials and derivatives are, for example, waxes such as those of vegetable, animal, or mineral origin (e.g. Japan wax, Candelilla wax, carnauba wax, Bayberry wax, waxes prepared from hydrogenated plant oils, such as palm and soybean, specific examples of mineral waxes are Ozocerite, Utah, Peat and Montan waxes; specific examples of natural waxes are insect waxes, shellac waxes, Ouricury waxes and sugar cane waxes, and the like; and an alkyl diester or higher degree of esterification of a sugar. One example of such a material is a sucrose ester such as sucrose stearate, sucrose distearate, and mixtures thereof such as that provided by Croda Canada Ltd., and sold under the trade name "Crodesta F-10." Other naturally derived materials may include a glycerol ester of hydrogenated abietic (rosin) acid, such as that provided by Arakawa Chemicals Industries of Osaka, Japan, and sold under the trade name "KE-100".

A number of other resins and waxes may further be selected for the ink of the present disclosure, particularly those made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. Also suitable are number of plasticizers, dispersants, colorants including pigments and natural colorants, and alternative low melting waxes known in the art. It is desired that the total amount of naturally derived materials in the ink be from about 15 to about 90 weight percent and desirably as high as possible while maintaining desired print quality. In some embodiments, solid ink sets contain above 50 percent by weight of naturally derived materials, such as up to 99 percent by weight of naturally derived materials, thereby resulting in reduced environmental impact.

Additional resins and waxes may further be selected from the group consisting of a urethane resin obtained from the reaction of two equivalents of ABITOL® E hydroabietyl alcohol and one equivalent of isophorone diisocyanate, prepared as described in U.S. Pat. No. 5,782,996, the disclosure of which is totally incorporated herein by reference; a urethane resin that was the adduct of three equivalents of stearyl isocyanate and a glycerol base alcohol; prepared as described in Example 4 of U.S. Pat. No. 6,309,453 the disclosure of which is totally incorporated herein by reference; suitable amides including, for example, diamides, triamides, tetra-amides, cyclic amides and the like. Fatty amides including monoamides, tetra-amides, and mixtures thereof, are disclosed in, for example, U.S. Pat. Nos. 4,889,560, 4,889,761, 5,194,638, 4,830,671, 6,174,937, 5,372,852, 5,597,856, and 6,860,930 and British Patent No. GB 2 238 792, the entire disclosures of each are incorporated herein by reference; and those similar to what is described in U.S. Pat. No. 6,620,228, which is incorporated herein in its entirety.

Further resins suitable for use herein include triamides. Triamides suitable for use herein include linear triamides, which are molecules where all three amide groups are drawn in the same molecular chain or branch. Examples of linear triamides include those triamides having the following formulas:

R can be any hydrocarbon having from about 1 to about 200, carbon atoms, such as from about 25 to 150 carbon atoms or from about 30 to about 100 carbon atoms.

Linear triamides can further include those wherein a line can be drawn through the three amide groups, even if one would ordinarily draw a different line. One example of such a triamide can be expressed by the following formula:

which can also be drawn as:

In embodiments, the triamide may also be a branched triamide. Examples of suitable branched triamides include those triamides disclosed in U.S. Pat. No. 6,860,930, which is incorporated herein in its entirety by reference. Any branched triamide disclosed in U.S. Pat. No. 6,860,930, is suitable for use herein. Examples of branched triamides suitable for use herein include those having the formulas:

and the like are disclosed in U.S. Pat. No. 6,860,930. In such branched triamides, $R_1$ and $R_2$ may be (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), having from about 3 carbon atoms to about 200 carbon atoms, such as from about 15 carbon atoms to about 150 carbon atoms or from about 21 carbon atoms to about 100 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group), having from about 6 carbon atoms to about 200 carbon atoms, such as from about 10 carbon atoms to about 150 carbon atoms or from about 14 carbon atoms to about 100 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), having from about 7 carbon atoms to about 200 carbon atoms, such as from about 8 carbon atoms to about 150 carbon atoms or from about 9 carbon atoms to about 100 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), having from about 7 carbon atoms to about 200 carbon atoms, such as from about 8 carbon atoms to about 150 carbon atoms or from about 9 carbon atoms to about 100 carbon atoms, although the number of carbon atoms can be outside of these ranges, such as tolylene or the like, $R_a$, $R_b$, $R_c$, $R_g$, $R_h$, $R_j$, $R_k$, $R_p$ and $R_q$ may each independently be (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in embodiments from about 1 carbon atoms to about 200 carbon atoms, such as from about 6 carbon atoms to about 150 carbon atoms or from about 10 carbon atoms to about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), having from about 6 carbon atoms to about 200 carbon atoms, such as from about 10 carbon atoms to about 150 carbon atoms or from about 14 carbon atoms to about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), having from about 6 carbon atoms to about 200 carbon atoms, such as from about 7 carbon atoms to about 150 carbon atoms or from about 8 carbon atoms to about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), having from about 6 carbon atoms to about 200 carbon atoms, such as from about 7 carbon atoms to about 150 carbon atoms or from about 8 carbon atoms to about 100 carbon atoms, although the number of carbon atoms can be outside of these ranges, such as tolyl or the like, $R_d$, $R_e$ and $R_f$ may each independently be (i) an alkyl group as described above, (ii) an aryl group as described above, (iii) an arylalkyl group as described above, or (iv) an alkylaryl group as described above.

In embodiments, the "environmentally friendly" solid phase change inks of the present disclosure can be printed on papers in the temperature range of about 100° C. to about 140° C., such as from about 105° C. to about 130° C., or from about 110° C. to about 120° C. The inks of the present disclosure can also be printed directly on plain paper or alternative substrates, and fixed under controlled temperature and pressure, such as from about 2° C. to about 15° C. below the onset of crystallization of the natural ink vehicle, to about 70° C. The inks described in this disclosure may also generally have melt viscosities at the jetting temperature, which can be no higher than about 145° C., such as less than about 140° C., at no more than about 30 centipoise, such as no more than about 25 centipoise, and in yet another embodiment of no more than about 15 centipoise, such as no less than about 2 centipoise, or no less than about 3 centipoise, or no less than about 4 centipoise, although the melt viscosity can be outside of these ranges.

In addition to the solid phase change ink compositions specifically described herein, further ink design latitude and improved ink performance can be achieved by synthesizing lower viscosity esters of sucrose or by incorporating other naturally derived oils or waxes into the proposed design.

The inks described herein may be low energy inks. Low energy inks are solid at a temperature below about 40° C. and have a viscosity of from about 5 to about 15 cPs at a jetting temperature of from about 50° C. to about 145° C., such as from about 70° C. to about 120° C. or from about 80° C. to about 120° C. The inks may jet at lower temperatures as above, and thus require lower amounts of energy for jetting.

Any suitable ink vehicle can be employed. Suitable vehicles can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers such as further discussed below, and mixtures thereof.

Examples of suitable specific ink vehicles include, for example, ethylene/propylene copolymers, such as those available from Petrolite and of the general formula wherein z represents an integer from 0 to about 30, for example from 0 to about 20 or from 0 to about 10, y represents an integer from 0 to about 30, for example from 0 to about 20 or from 0 to about 10 and x is equal to about 21-y. The distribution of the side branches may be random along the carbon chain. The copolymers may have, for example, a melting point of from about 70° C. to about 150° C., such as from about 80° C. to about 130° C. or from about 90° C. to about 120° C. and a molecular weight range of from about 500 to about 4,000. Commercial examples of such copolymers include, for example, Petrolite CP-7 (Mn=650), Petrolite CP-11 (Mn=1,100, Petrolite CP-12 (Mn=1,200) and the like.

A still further example includes hydrocarbon-based waxes, such as the homopolymers of polyethylene available from Petrolite and of the general formula wherein x is an integer of from about 1 to about 200, such as from about 5 to about 150 or from about 12 to about 105. These materials may have a melting point of from about 60° C. to about 150° C., such as from about 70CC. to about 140° C. or from about 80° C. to about 130° C. and a molecular weight (Mn) of from about 100 to about 5,000, such as from about 200 to about 4,000 or from about 400 to about 3,000. Examples of wax ink vehicles include POLYWAX® 400 (Mn about 400), distilled POLYWAX® 400, in one embodiment having a viscosity of about 10% to about 100% higher than the viscosity of the undistilled POLYWAX® 400 at about 110° C., POLYWAX® 500 (Mn about 500), distilled POLYWAX® 500, in one embodiment having a viscosity of about 10% to about 100% higher than the viscosity of the undistilled POLYWAX® 500 at about 110° C., POLYWAX 655 (Mn about 655), distilled POLYWAX® 655, in one embodiment having a viscosity of about 10% to about 50% lower than the viscosity of the undistilled POLYWAX® 655 at about 110° C., and in yet another embodiment having a viscosity of about 10% to about 50% higher than the viscosity of the undistilled POLYWAX® 655 at about 110° C., POLYWAX 850 (Mn about 850), POLYWAX 1000 (Mn about 1,000), and the like. Optionally the polyethylene wax may be selected such that it has the properties achieved by fractionation as described in copending U.S. patent application Ser. No. 11/290221, filed Nov. 30, 2005.

Urethane, urea, amide and imide derivatives of oxidized synthetic or petroleum waxes, such as those available from Petrolite and of the general formulas wherein R is an alkyl group of the formula $CH_3(CH_2)_n$, n. is an integer of from about 5 to about 400, for example from about 10 to about 300 or from about 20 to about 200 and R' is a tolyl group, may also be used as the ink vehicle. In embodiments, the urethane, urea, amide and imide derivatives maybe linear, branched, cyclic and any combination thereof. These materials may have a melting point of from about 60° C. to about 120° C., such as from about 70° C. to about 100° C. or from about 70° C. to about 90° C. Commercial examples of such materials include, for example, bis-urethanes such as PETROLITE CA-11®, PETROLITE WB-5® and PETROLITE WB-17®, all available from Baker Petrolite, and the like. Suitable examples also include urethane, urea, amide and imide derivatives disclosed in U.S. Pat. Nos. 6,620,228, 6,380,423, 6,464,766 and 6,309,453, each of which is incorporated herein, by reference.

Other suitable carrier materials that can be used in the solid ink compositions include, for example, isocyanate-derived resins and waxes, such as urethane isocyanate-derived materials, urea isocyanate-derived materials, urethane/urea isocyanate-derived materials, mixtures thereof, and the like. Further information on isocyanate-derived earner materials is disclosed in, for example, U.S. Pat. Nos. 5,750,604, 5,780, 528, 5,782,966, 5,783,658, 5,827,918, 5,830,942, 5,919,839, 6,255,432, and 6,309,453, British Patents Nos. GB 2 294 939, GB 2 305 928, GB 2 305 670, and GB 2 290 793, and PCT Publications WO 94/14902, WO 97/12003, WO 97/13816, WO 96/14364, WO 97/33943, and WO 95/04760, the entire disclosures of each of which are incorporated herein by reference.

Another type of ink vehicle may be n-paraffinic, branched paraffinic, and/or aromatic hydrocarbons, typically with from about 5 to about 100, such as from about 20 to about 180 or from about 30 to about 60 carbon atoms, generally prepared by the refinement of naturally occurring hydrocarbons, such as BE SQUARE 185 and BE SQUARE 195, with molecular weights (Mn) of from about 100 to about 5,000, such as from about 250 to about 1,000 or from about 500 to about 800, for example such as available from Petrolite.

Highly branched hydrocarbons, typically prepared by olefin polymerization, such as the VYBAR materials available from Petrolite, including VYBAR 253 (Mn=520), VYBAR 5013 (Mn=420), and the like, may also be used. In addition, the ink vehicle may be an ethoxylated alcohol, such as available from Petrolite and of the general formula wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight (Mn) range of from about 100 to about 5,000, such as from about 500 to about 3,000 or from about 500 to about 2,500. Commercial examples include UNITHOX 420 (Mn=560), UNITHOX 450 (Mn=900), UNITHOX 480 (Mn=2,250), UNITHOX 520 (Mn=700), UNITHOX 550 (Mn=1,100), UNITHOX 720 (Mn=875), UNITHOX 750 (Mn=1,400), and the like.

As an additional example, mention may be made of fatty amides, such as monoamides, tetra-amides, mixtures thereof, and the like, for example such as described in U.S. Pat. No. 6,858,070, incorporated herein by reference. Suitable monoamides may have a melting point of at least about 50° C., for example from about 50° C. to about 150° C., although the melting point can be below this temperature. Specific examples of suitable monoamides include, for example, primary monoamides and secondary monoamides. Stearamide, such as KEMAMIDE S available from Chemtura Corporation and CRODAMIDE S available from Croda, behenamide/arachidamide, such as CRODAMIDE BR available from Croda, oleamide, such as KEMAMIDE U available from Chemtura Corporation and CRODAMIDE OR available from Croda, technical grade oleamide, such as KEMAMIDE OR available from Chemtura Corporation, CRODAMIDE O available from Croda, and UNISLIP 1753 available from Uniqema, and erucamide such as KEMAMIDE E Ultra available from Chemtura Corporation, derived from a vegetable source, and CRODAMIDE ER available from Croda, are some examples of suitable primary amides. Stearyl stearamide, such as KEMAMIDE S-180 available from Chemtura Corporation, stearyl erucamide, such as KEMAMIDE E-180 available from Chemtura Corporation and CRODAMIDE 212 available from Croda, oleyl palmitamide, such as KEMAMIDE P-181 available from Chemtura Corporation and CRODAMIDE 203 available from Croda, and erucyl stearamide, such as KEMAMIDE S-221 available from Chemtura Corporation, are some examples of suitable secondary amides. Additional suitable amide materials include, Crodamide VRX, a refined vegetable oleamide available from Croda, Crodamide SRV, a refined vegetable stearamide available from Croda and derived entirely from GM-free vegetable feedstock, Crodamide EBO, an ethylene bis-oleamide available from Croda and KEMAMIDE W20 (N,N'-ethylenebisoleamide) Preferred Crodamide products are those derived from vegetable based materials (High Erucic Rapeseed Oil) such as: Crodamide E, Crodamide ER, Crodamide VRX, Crodamide SRV, Crodamide BR, Crodamide 203, Crodamide 212, Crodamide EBO, and optionally Crodamide EBSV, an ethylene bis-stearamide.

High molecular weight linear alcohols, such as those available from Petrolite and of the general formula wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN materials such as UNILIN 425 (Mn=460), UNILIN 550 (Mn=550), UNILIN 700 (Mn=700), and the like.

Another example includes modified maleic anhydride hydrocarbon adducts of polyolefins prepared by graft copolymerization, such as those available from Petrolite and of the general formulas wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C; those available from Petrolite and of the general formula wherein x is an integer of from about 1 to about 50, such as from about 5 to about 25 or from about 9 to about 13, y is 1 or 2, and z is an integer of from about 1 to about 50, such as from about 5 to about 25 or from about 9 to about 13; and those available from Petrolite and of the general formula wherein $R_1$ and $R_3$ are hydrocarbon groups and $R_2$ is either of one of the general formulas or a mixture thereof, wherein R' is an isopropyl group, which materials may have melting points of from about 70° C. to about 150° C., such as from about 80° C. to about 130° C. or from about. 90° C. to about 125° C., with examples of modified maleic anhydride copolymers including CERAMER 67 (Mn=655, Mw/Mn=1.1), CERAMER 1608 (Mn=700, Mw/Mn=1.7), and the like.

Additional examples of suitable ink vehicles for the phase change inks include polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters: poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, montan wax, candelilla wax, GILSONITE (American Gilsonite Company), and the like: mixtures of linear primary alcohols with linear long chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bis-ricinoleamide), and the like. Further, linear long chain sulfones with from about 4 to about 16 carbon atoms, such as diphenyl sulfone, n-amyl sulfone, n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, chlorophenyl methyl sulfone, and the like, are suitable ink vehicle materials.

In addition, the ink vehicles described in U.S. Pat. No. 6,906,118, incorporated herein by reference in its entirety, may also be used. Also suitable as ink vehicles are liquid crystalline materials as disclosed in, for example, U.S. Pat. No. 5,122,187, the disclosure of which is totally incorporated herein by reference.

The ink vehicle may comprise one or more of the aforementioned suitable materials. As used herein, "one or more" and "at least one" refers to from 1 to about 10, such as from 1 to about 8 or from 1 to about 5 of any given feature disclosed herein.

The ink vehicle may comprise from about 60% to about 99.5% by weight of the ink, for example from about 70% to about 98% or from about 80% to about 95% by weight of the ink.

Many ink vehicles of phase change inks have an electrical conductivity of essentially zero. Thus, conductivity enhancing agents may be added to the ink vehicle in order to provide consistent conductivity to the ink. The conductivity is used as an input signal for a level sensor in the ink reservoir of the ink jet device.

Prior components of a phase change ink that may have contributed to the electrical conductivity if the phase change inks were colorants such as pigments and dyes, and dodecyl benzene sulfonic acid (DDBSA), as disclosed in U.S. Pat. No. 6,015,847, and incorporated herein by reference.

In embodiments, the conductivity enhancing agent is an organic salt formed from an organic base and an acid. The conductivity enhancing agent does not detrimentally affect any printer parts (for example, printheads or reservoirs of an ink jet device) as do other conductivity enhancing agents (for example, DDBSA).

The organic base of the organic salt of the conductivity enhancing agent may be an organic amine and have at least one long hydrocarbon chain, "Long hydrocarbon chain" refers to, for example, a linear or branched carbon alkyl or aryl chain having from about 10 carbons to about 50carbons, such as from about 15 to about 40 carbons or from about 15 carbons to about 30 carbons. The long carbon chain of the organic salt allows it to be miscible in the ink vehicle.

Examples of organic bases that are suitable for use herein are derived from tertiary amine compounds having the following generic formula, which may include tri-hexadecyl amine (ARMEEN® 316, molecular weight 689).

In embodiments the organic bases may be derived from trioctadecyl amine, tridodecyl amine, tritetradecyl amine, trieicosyl amine, tridocosylamine, tritetracosylamine, mixed forms like didodecyl octadecyl amine, didocosyl tetracosyl amine, ditetracosyl tetradecyl amine, and the like, and aryl-aliphatic compounds, such as di(1-decyl-4-nonyl-phenyl) docosyl amine:

or 4-nonylphenyl dioctadecyl amine, as shown below:

In embodiments, the organic base may be a primary, secondary or tertiary amine. An example of a suitable primary amine may be represented by the general formula wherein x is an integer from about 1 to about 50, such as from about 10 to about 40 or from about 12 to about 30, for example, a hexadecyl amine. An example of a suitable secondary amine may be represented by the general formula wherein x is an integer from about 1 to about 50, such as from about 10 to about 40 or from about 12 to about 30, for example, a di-octadecyl amine.

An acid reacts with the organic base described above to form the organic salt. Substituents in the acid anion with a high electronegativity, for example, fluorine atoms, are desirable in order to facilitate the reaction between acid and base and produce a large number of molecule anions and cations. These molecule anions and cations may act as carriers for the electrical charge in an applied outer electrical field. The substituents in the acid anion, when placed close enough to certain functional groups in the molecule, may pull electrons away from potentially acid O—H or C—H bonds. This allows for an easier separation of the positively charged hydrogen atoms (protons) from the remainder of the molecule. These mobile protons may then associate with the molecules of the base, and form molecular cations of this base. Thus, the presence of electronegative substituents in the molecules of the acid may tend to shift the equilibrium of neutral acids and bases towards charged species. In turn, these charged species may be the source for carriers having an electrical charge.

Another aspect is that the molecular ion of an acid suitable for use herein has a high mobility, thus enhancing the conductivity of the phase change ink. This high mobility may be achieved by using a small molecular ion. However, when small molecular ions are used, the solubility of the organic salt decreases. Thus, the size of the molecular ion must be sufficient to maintain the solubility of the organic salt in the phase change ink, while at the same time exhibiting sufficient mobility so as to enhance the conductivity of the phase change ink.

Examples of acid generated suitable molecular ions that may be used herein include the ions of acids such as trifluoroacetic acid, methane sulfonic acid and trifluoro methane sulfonic acid. Such acids may have a molecular weight from about 25 to about 250, such as from about 25 to about 225 or from about 50to about 250.

The estimated half life of the organic salt under a constant temperature of about 120° C. is from about 15 days to about 250 days, such as from about 20 days to about 225 days or from about 20 days to about 200 days.

The phase change ink disclosed herein may contain one organic salt, or a mixture of one or more suitable organic salts, for example from about 1 to about 10 organic salts, such as from about 1 to about 4 or from about 1 to about 2 organic salts. Each organic salt is present in the ink in any effective amount, for example from about 0.001 weight percent to about 8 weight percent, such as from about 0.1 weight percent to about 5 weight percent or from about 0.25 weight percent to about 5 weight percent of the ink.

The organic salt described herein imparts a high electrical conductivity to phase change inks by sufficiently dissociating into molecular ions with high ion mobility. Specifically, the organic salt will dissociate into ions, that is, anions and cations, to provide the phase change ink with high electrical conductivity during operation of an inkjet device.

The conductivity of the phase change ink having the conductivity enhancing agent therein may be from about 0.01 µS/cm to about 5 µS/cm, such as from about 0.05 µS/cm to about 4 μS/cm or from about 0.09 μS/cm to about 2.5 μS/cm. Conductivity may be measured by any known method, and herein is measured under melt conditions at about 120° C. by placing titanium electrodes in the molten ink and reading the resistivity output on a Rosemount Model 1054B LC Conductivity Meter at a frequency of 60 Hz. In general, the conductivity of a material can be measured in terms of the reciprocal of resistivity, which is a material specific and temperature dependent measurement for electrical resistance.

The organic salts disclosed herein are soluble in the non-polar organic environment of phase change inks, demonstrate thermal stability in phase change inks when an ink jet device is operating, are waxy solids at room temperature, may positively influence the mechanical durability of printed, solid inks, and do not etch or attack printer parts which may contact the organic salts found in the phase change inks.

The phase change inks also contain at least one colorant, for example, from 1 to about 10, such as from 1 to about 4 or from 1 to about 2 colorants. The colorant is present in the ink in any desired amount, typically from about 0.5 to about 20 percent by weight of the ink vehicle or ink vehicle mixture, for example from about 1 to about 10 percent by weight of the ink vehicle or ink vehicle mixture.

The inks disclosed herein may contain any suitable colorant which may include at least one dye or pigment. As used herein the term "colorant" includes pigment, dye, mixtures of dyes, mixtures of pigments, mixtures of dyes and pigments, and the like. Any dye or pigment maybe chosen, provided that it is capable of being dispersed or dissolved in the ink vehicle and is compatible with the other ink components.

Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2G01 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like.

Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer: Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like.

In embodiments, solvent dyes may be utilized. Examples of solvent dyes include spirit soluble dyes which are compatible with the ink vehicles disclosed herein. Examples of suitable spirit solvent dyes include Neozapon Red 492 (BASF); Orasol Red G (Cuba); Direct Brilliant Pink B (Global Colors); Aizen Spilon Red C—BH (Hodogaya Chemical); Kayanol Red 3BL (Nippon Kayaku); Spirit Fast Yellow 3G; Aizen. Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF) and the like.

In embodiments, suitable colorants, dyes and/or pigments may be selected from those disclosed in U.S. Pat. No. 6,726,755, U.S. Pat. No. 6,472,523, U.S. Pat. No. 6,476,219, U.S. Pat. No. 6,673,139, U.S. Pat. No. 6,713,614, U.S. Pat. No. 6,755,902, U.S. Pat. No. 6,576,747, U.S. Pat. No. 6,576,748, U.S. Pat. No. 6,590,082, U.S. Pat. No. 6,646,111, U.S. Pat. No. 6,663,703, U.S. Pat. No. 6,860,931, U.S. Pat. No. 6,835,238, U.S. Pat. No. 6,958,406 and U.S. Pat. No. 6,821,327, each of which is incorporated herein by reference. Preferred dyes are for example, a Cyan colorant such as the one disclosed in Example VIII of U.S. Pat. No. 6,472,523, the disclosure of which is totally incorporated herein by reference; Neopen Yellow 075 (obtained from BASF, Germany); Solvent Red 49, a rhodamine colorant available from BASF, Germany; n-butyl Solvent Red 172 available from United Color Manufacturing Inc. under the trade name Unigraph Red 1900; Savinyl Black NS, available from Clariant; Disperse Orange 47 available from Clariant and mixtures thereof.

Other optional additives such as dispersing agents or surfactants may be present in the inks, typically in amounts of from about 0.01 to about 20 percent by weight. Plasticizers that may be used include pentaerythritol tetrabenzoate, commercially available as BENZOFLEX S552 (Velsicol Chemical Corporation), trimethyl titrate, commercially available as CITROFLEX 1 (Monflex Chemical Company), N,N-dimethyl oleamide, commercially available as HALCOMID M-18-OL (C. P. Hall Company), a benzyl phthalate, commercially available as SANTICIZER 278 (Ferro Corporation), and the like, may be added to the ink vehicle, and may constitute from about 1 to 40 percent of the ink vehicle component of the ink. Plasticizers can either function as the ink vehicle or can act as an agent to provide compatibility between the ink components.

Optional antioxidants in the ink may protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba-Geigy Corporation), (2) 2,2-bis(4-(2-(3,5-di-tert-butyl-4-hydroxyhydrocinnamoyloxy))ethoxyphenyl) propane (TOPANOL-205, available from ICI America Corporation), (3) tris(4-tert-butyl-3-hydroxy-2,6-dimethyl benzyl) isoCyanurate (CYANOX 1790, 41,322-4, LTDP, Aldrich D12,840-6), (4) 2,2'-ethylidene bis(4,6-di-tert-butylphenyl) fluoro phosphonite (ETHANOX-398, available from Ethyl Corporation), (5) tetrakis(2,4-di-tert-butylphenyl)-4,4'-biphenyl diphosphonite (ALDRICH 46,852-5; hardness value 90), (6) pentaerythritol tetrastearate (TCI America #PO739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl) phenol (Aldrich 23,008-1), (10) 4-bromo-2,6-dimethylphenol (Aldrich 34,951-8), (11) 4-bromo-3,5-didimethylphenol (Aldrich B6,420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich D14,400-2), (15) 2-amino-4-tert-amylphenol (Aldrich 41,258-9), (16) 2,6-bis(hydroxymethyl)-p-cresol (Aldrich 22,752-8), (17) 2,2'-methylenediphenol (Aldrich B4,680-8), (18) 5-(diethylamino)-2-nitrosophenol (Aldrich 26,951-4), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Aldrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis (trifluoromethyl) benzoic acid (Aldrich 32,527-9), (30) ethyl-2-(4-(4-(trifluoromethyl) phenoxy) phenoxy) propionate (Aldrich 25,074-0), (31) tetrakis (2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Uniroyal Chemical Company), and the like, as well as mixtures thereof. The antioxidant, when present, may be present in the ink in any desired or effective amount, such as from about 0.15 percent to about 10 percent by weight of the ink or from about 0.2 percent to about 3 percent by weight of the ink.

The ink can also optionally contain a UV absorber. The optional UV absorbers primarily protect the generated images from UV degradation. Specific examples of suitable UV absorbers include (1) 2-bromo-2',4-dimethoxyacetophenone (Aldrich 19,948-6), (2) 2-bromo-2',5'-dimethoxyacetophenone (Aldrich 10,458-2), (3) 2-bromo-3'-nitroacetophenone (Aldrich 34,421-4), (4) 2-bromo-4'-nitroacetophenone (Aldrich 24,561-5), (5) 3',5'-diacetoxyacetophenone (Aldrich 11,738-2), (6) 2-phenylsulfonyl acetophenone (Aldrich 34,150-3), (7) 3'-aminoacetophenone (Aldrich 13,935-1), (8) 4'-aminoacetophenone (Aldrich A3,800-2), (9) 1H-benzotriazole-1-acetonitrile (Aldrich 46,752-9), (10) 2-(2H-benzotriazol-2-yl)-4,6-di-tert-pentylphenol (Aldrich 42,274-6), (11) 1,1-(1,2-ethane-diyl)bis(3,3,5,5-tetramethylpiperazinone) (commercially available from Goodrich Chemicals), (12) 2,2,4-trimethyl-1,2-hydroquinoline (commercially available from Mobay Chemical), (13) 2-(4-benzoyl-3-hydroxy phenoxy)ethylacrylate, (14) 2-dodecyl-N-(1,2,2,6,6-pentamethyl-4-piperidinyl) succinimide (commercially available from Aldrich Chemical Co., Milwaukee, Wis.), (15) 2,2,6,6-tetramethyl-4-piperidinyl/β-tetramethyl-3,9-(2,4,8,10-tetraoxo spiro(5,5)-undecane) diethyl-1,2,3,4-butane tetracarboxylate (commercially available from Fairmount), (16) N-(p-ethoxycarbonylphenyl)-N'-ethyl-N'-phenylformadine (commercially available from Givaudan), (17) 6-ethoxy-1,2-dihydro-2,2,4-trimethylquinoline (commercially available from Monsanto Chemicals), (18) 2,4,6-tris-(N-1,4-dimethylpentyl-4-phenylenediamino)-1,3,5-triazine (commercially available from Uniroyal), (19) 2-dodecyl-N-(2,2,6,6-tetrame-thyl-4-piperidinyl) succinimide (commercially available from Aldrich Chemical Co.), (20) N-(1-acetyl-2,2,6,6-tetramethyl-4-piperidinyl)-2-dodecyl succinimide (commercially available from Aldrich Chemical Co.), (21) (1,2,2,6,6-pentamethyl-4-piperidinyl/β-tetramethyl-3,9-(2, 4,8,10-tetra oxo-spiro-(5,5)undecane)diethyl)-1,2,3,4-butane tetracarboxylate (commercially available from Fairmount), (22) (2,2,6,6-tetramethyl-4-piperidinyl)-1,2,3,4-butane tetracarboxylate (commercially available from Fairmount), (23) nickel dibutyl dithio carbamate (commercially available as UV-Chek AM-105 from Ferro), (24) 2-amino-2',5-dichlorobenzophenone (Aldrich 10,515-5), (25) 2'-amino-4',5'-dimethoxyacetophenone (Aldrich 32,922-3), (26) 2-benzyl-2-(dimethylamino)-4'-morpholino butyrophenone (Aldrich 40,564-7), (27) 4'-benzyloxy-2'-hydroxy-3'-methylacetophenone (Aldrich 29,884-0), (28) 4,4'-bis(diethylamino) benzophenone (Aldrich 16,032-6), (29) 5-chloro-2-hydroxy benzophenone (Aldrich C4,470-2), (30) 4'-piperazinoacetophenone (Aldrich 13,646-8), (31) 4'-piperidinoacetophenone (Aldrich 11,972-5), (32) 2-amino-5-chlorobenzophenone (Aldrich A4,556-4), (33) 3,6-bis(2-methyl-2-morpholinopropionyl)-9-octylcarbazole (Aldrich 46,073-7), and the like, as well as mixtures thereof. When present, the optional UV absorber may be present in the ink in any desired or effective amount, such as from about 1 percent to about 10 percent by weight of the ink or from about 3 percent to about 5 percent by weight of the ink.

The phase change ink compositions may be prepared by combining all of the ingredients (the organic base and the acid being considered individual ingredients), heating the mixture to at least its melting point, for example from about 50° C. to about 140° C., and stirring the mixture, for example from about 5 minutes to about 180 minutes or more, to obtain a substantially homogeneous, uniform melt. When pigments are the selected colorants, the molten mixture may be subjected to grinding in an attritor or ball mill apparatus in presence of an optional dispersant to have an effect on the dispersion of the pigment in the ink vehicle. Once formed, the ink may be cooled to room temperature, for example, from about 23° C. to about 27° C., wherein it is ready for addition into an inkjet device.

Printed images may be generated with the ink described herein by incorporating the ink into an inkjet device, for example an acoustic ink jet device or a piezoelectric inkjet device, and concurrently causing droplets of the molten ink to be ejected in a pattern onto a substrate such as paper or transparency material, which can be recognized as an image. The ink is typically included in the at least one reservoir connected by any suitable feeding device to the ejecting channels and orifices of the inkjet head for ejecting the ink. In the jetting procedure, the ink jet head may be heated, by any suitable method, to the jetting temperature of the inks. The phase change inks are thus transformed from the solid state to a molten state for jetting.

The inks can also be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate, such as paper or transparency.

Embodiments described above will now be further illustrated by way of the following examples. A number of inks were designed to demonstrate the feasibility of the present disclosure. These inks are formulated by a process similar to that used in present commercial inks. The following discussion is with respect to the Cyan control ink shown in Table 1 and 2, although it is understood that the remaining inks were made in the same manner, but with the indicated materials and amounts. In the following examples, Resins A, B, C, and D are respectively: Resin A) a tetra-amide resin (tetra-amide prepared as in Example I of U.S. Pat. No. 6,174,937, which is incorporated herein by reference in its entirety by reference); Resin B) a triamide resin (tri-amide prepared as in Example II of U.S. Pat. No. 6,860,930, which is incorporated herein in its entirety by reference); Resin C) a urethane resin derived from the reaction of two equivalents of hydroabietyl alcohol and one equivalent of isophorone diisocyanate, disclosed in U.S. Pat. No. 6,858,070, Col. 12, line 37-39, which is incorporated herein by reference in its entirety and prepared as described in U.S. Pat. No. 5,782,996, the disclosure of which is totally incorporated herein by reference; and Resin D) a urethane resin that is the adduct of three equivalents of stearyl isocyanate and a glycerol-based alcohol, disclosed in U.S. Pat. No. 6,858,070, Col. 12, lines 48-50, which is incorporated herein by reference in its entirety by reference. It is prepared as described in Example 4 of U.S. Pat. No. 6,309,453 the disclosure of which is totally incorporated herein by reference. The following colorants are used in the examples of Table 1 and 2: A Cyan colorant (Cyan Dye) disclosed in Example VIII of U.S. Pat. No. 6,472,523, the disclosure of which is totally incorporated herein by reference; The yellow colorant is Neopen Yellow 075 (obtained from BASF, Germany); The magenta colorant is a mixture of Solvent Red 49, a rhodamine colorant available from BASF, Germany and n-butyl Solvent Red 172 available from United Color Manufacturing Inc. under the trade name Unigraph Red 1900; The black colorant is a mixture of Savinyl Black NS, available from Clariant; and Disperse Orange 47 available from Clariant.

EXAMPLES

Example 1

Preparation of Control Ink #1

The following materials were melted together in a 250 ml beaker at a temperature of about 140° C. in an oven: 1) 47.35 grams of Polywax 655; 2) 12.75 grams of Stearyl Stearamide (S-180); 3) 17.40 grams of tetra-amide resin (tetra-amide) (Resin A) prepared as in Example 1 of U.S. Pat. No. 6,174,937, which is incorporated herein by reference in its entirety); 4) 12.00 grams of a urethane resin obtained from the reaction of two equivalents of ABITOL® E hydroabietyl alcohol and one equivalent of isophorone diisocyanate (Resin C); 5) 5.00 grams of a urethane resin that was the adduct of three equivalents of stearyl isocyanate and a glycerol base alcohol; prepared as described in Example 4 of U.S. Pat. No. 6,309,453 the disclosure of which is totally incorporated herein by reference (Resin D; and 6) 0.20 grams of Nauguard 445. The resulting mixture is then stirred for approximately one hour while maintaining the temperature between 120° C. and 135° C. with a heating block. While mixing, 5.3 grams of a Cyan dye is added slowly and the resulting Cyan control ink is further heated and mixed for approximately 2 hours. The resultant ink is then filtered through a heated MOTT® apparatus (obtained from Mott Metallurgical) using NAE 0.2 micron filter under a pressure of about 15 pounds p.s.i. The filtered phase change ink is then poured into an aluminum mold and allowed to solidify to form an ink stick. The control ink exhibits a viscosity suitable for printing with a piezo printhead, such as the one used in Phaser SIJ ink products, at a temperature of about 140° C.

The foregoing example describes the synthesis of Control ink 1 shown in Table 1; however, Control inks 2-5 and Green Inks 1-8 were formulated by the same process, but with the indicated materials and amounts.

TABLE 1

| | Control Inks | | | | | Green Inks | | | | | | | |
|---|---|---|---|---|---|---|---|---|---|---|---|---|---|
| Raw Material (g) | Control 1 Cyan | Control 2 Magenta | Control 3 Yellow | Control 4 Black | Control 5 Cyan | Ink 1 Cyan | Ink 2 Magenta | Ink 3 Yellow | Ink 4 Black | Ink 5 Cyan | Ink 6 Cyan | Ink 7 Cyan | Ink 8 Cyan |
| Polywax 655 | 47.35 | 40.34 | 42.21 | 42.56 | 0.00 | 14.21 | 12.10 | 12.66 | 12.77 | 0.00 | 0.00 | 0.00 | 0.00 |
| Distilled Polywax ® 500 | 0.00 | 0.00 | 0.00 | 0.00 | 51.37 | 12.07 | 13.06 | 12.37 | 14.40 | 41.10 | 20.55 | 10.00 | 20.55 |
| S-180 | 12.75 | 21.17 | 18.32 | 20.87 | 14.75 | 3.83 | 6.35 | 5.50 | 6.26 | 0.00 | 11.80 | 0.00 | 11.80 |
| Crodamide VRX | 0.00 | 0.00 | 0.00 | 0.00 | 0.00 | 0.00 | 0.00 | 0.00 | 0.00 | 11.80 | 0.00 | 22.35 | 0.00 |
| Crodesta F-10 | 0.00 | 0.00 | 0.00 | 0.00 | 0.00 | 30.00 | 30.00 | 30.00 | 30.00 | | | 46.97 | 42.97 |
| Resin A | 17.40 | 17.94 | 22.70 | 15.05 | 0.00 | 17.40 | 17.94 | 22.70 | 15.05 | | | 6.14 | 6.85 |
| Resin B | 0.00 | 0.00 | 0.00 | 0.00 | 15.34 | 0.00 | 0.00 | 0.00 | 0.00 | | | | |
| Resin C | 12.00 | 11.70 | 9.82 | 10.37 | 0.00 | 12.00 | 11.70 | 9.82 | 10.37 | 0.00 | 0.00 | 0.00 | 0.00 |
| KE-100 resin | 0.00 | 0.00 | 0.00 | 0.00 | 13.89 | 0.00 | 0.00 | 0.00 | 0.00 | 11.11 | 10.00 | 10.00 | 14.00 |
| Resin D | 5.00 | 6.83 | 4.50 | 7.38 | 0.93 | 5.00 | 6.83 | 4.50 | 7.38 | 0.74 | 0.93 | 0.93 | 0.93 |
| Nauguard 445 | 0.20 | 0.20 | 0.21 | 0.21 | 0.17 | 0.20 | 0.20 | 0.21 | 0.21 | 0.14 | 0.07 | 0.07 | 0.07 |
| Cyan Dye | 5.30 | | | | 3.55 | 5.30 | | | | 2.84 | 3.55 | 3.55 | 2.84 |
| Solvent Red 45 | | 0.37 | | | | | 0.37 | | | | | | |
| Unigraph Red 1900 (Butyl SR172) | | 0.70 | | | | | 0.70 | | | | | | |
| DDBSA | | 0.75 | | | | | 0.75 | | | | | | |
| Nepun Yellow 075 (SY162) | | | 2.24 | | | | | 2.24 | | | | | |
| Soyinyl Black No. (SK27) | | | | 3.30 | | | | | 3.30 | | | | |
| Disperse Orange 47 | | | | 0.26 | | | | | 0.26 | | | | |
| Green Components (bold above) (g) | 0.00 | 0.00 | 0.00 | 0.00 | 13.89 | 30.00 | 30.00 | 30.00 | 30.00 | 42.91 | 56.97 | 79.32 | 56.97 |
| Total (g) | 100 | 100 | 100 | 100 | 100 | 100 | 100 | 100 | 100 | 100 | 100 | 100 | 100 |

Example 2

Characteristic Properties of Inks Comprised of Crodesta F-10 and Controls

An ink (Ink 9) comprising Crodesta F-10 (sucrose distearate) was developed according to the above methods and compared to a known (control) ink. The ink was jetted and transfixed under low energy conditions in a Phaser 8400 inkjet printer to produce images on plain paper of good gloss and scratch resistance. Fold characteristics and other parameters were not optimized; however, routine optimization with improved results can be expected. The following table illustrates the relative concentration of "green" and other constituents.

TABLE 2

Comparative Cyan Formulations

| Raw Material (g) | Control Ink 5 | Ink 9 |
|---|---|---|
| Distilled POLYWAX ® 500 | 51.37 | 37.23 |
| S-180 | 14.75 | 11.80 |
| Crodesta F-10 from Croda Inc. | 0.00 | 20.00 |
| Resin B | 15.34 | 15.34 |
| KE-100 resin from Arakawa Chemicals | 13.89 | 11.17 |
| Resin D | 0.93 | 0.74 |
| Naugard 445 | 0.17 | 0.17 |
| Cyan Dye | 3.55 | 3.55 |
| Total Green Components (g) | 13.89 | 31.17 |
| Total (g) | 100 | 100 |

The resultant ink was shown to be thermally stable upon heating at a jetting temperature of about 120° C. for about 24 hours. Ink viscosity was approximately 10.96 cPs at 120° C.; within jettable limits of low-energy control (LancE) ink. The melt transition occurred at about 50° C. with onset at about 50° C., and ink was successfully printed on a Phaser 8400 inkjet printer at jetting temperature of about 115° C. and transfix temperature of about 40-45° C.

Performance data was performed on Hammermill Laser and 4200 paper. Results Indicated good scratch resistance and gloss properties with Improved fold characteristics when compared to optimized Control 5 ink. Colouristic properties were similar between Ink 9 and the Control Ink 5; however, the present disclosure exhibited slight blue-shifting after accounting for optical density.

The results further indicate that the present disclosure may he suited to direct-to-paper printing and wider substrate latitude due to a lower fix temperature that facilitates pressure fixing and glossing of ink to paper.

Figure 1:
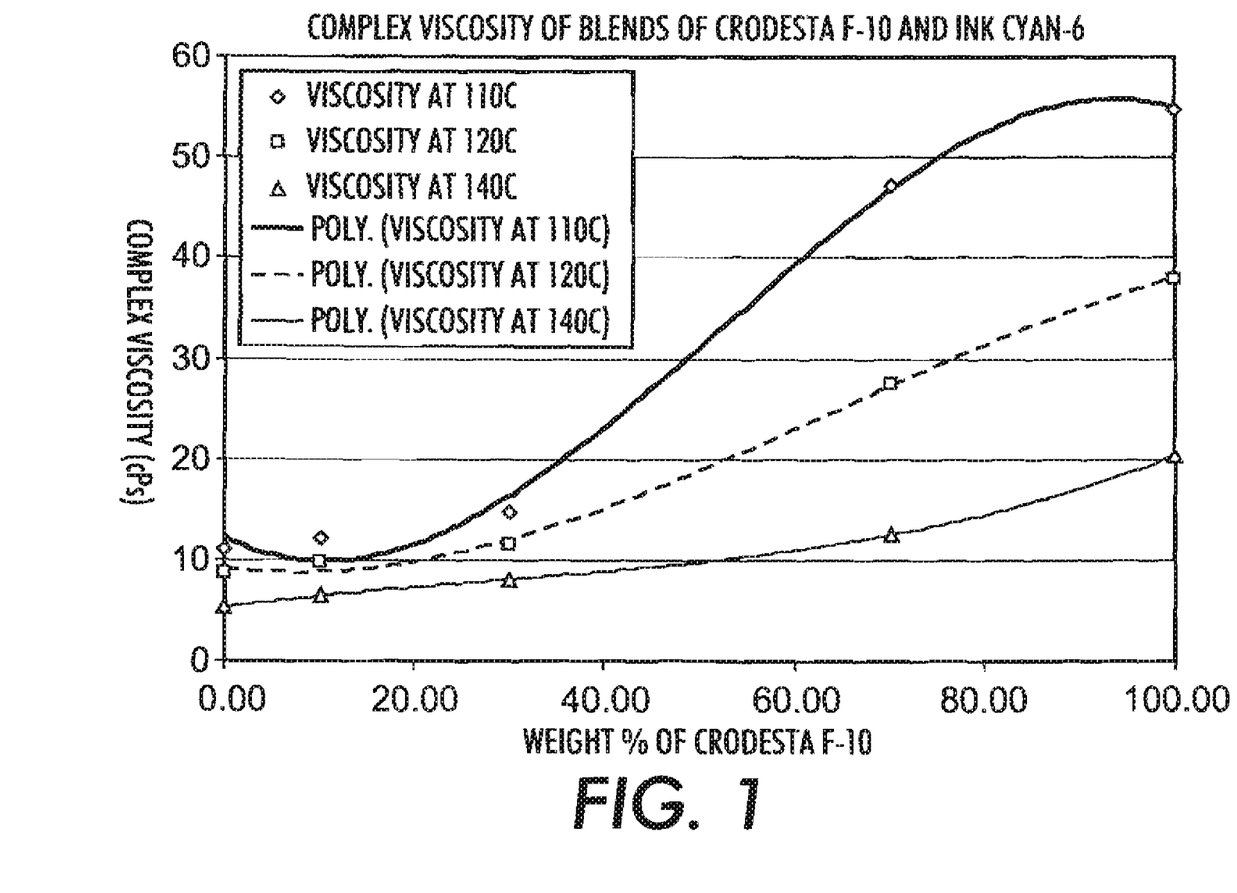
FIG. 1 is a graph showing complex viscosity of inks based on varying amounts of a component of Crodesta F-10 according to Examples of the disclosure.

The complex viscosities of blends of Crodesta F-10, available from Croda Inc., Parsippany, N.J., USA, with the Control Ink 5 were obtained in the temperature range of 110° C. to 140° C. using a RFS-3 rheometer. The results are shown in FIG. 1. The data indicates that up to 80% Crodesta F-10 can be used without increasing the viscosity of the blend above 15 cPs at 140° C.

Figure 2:
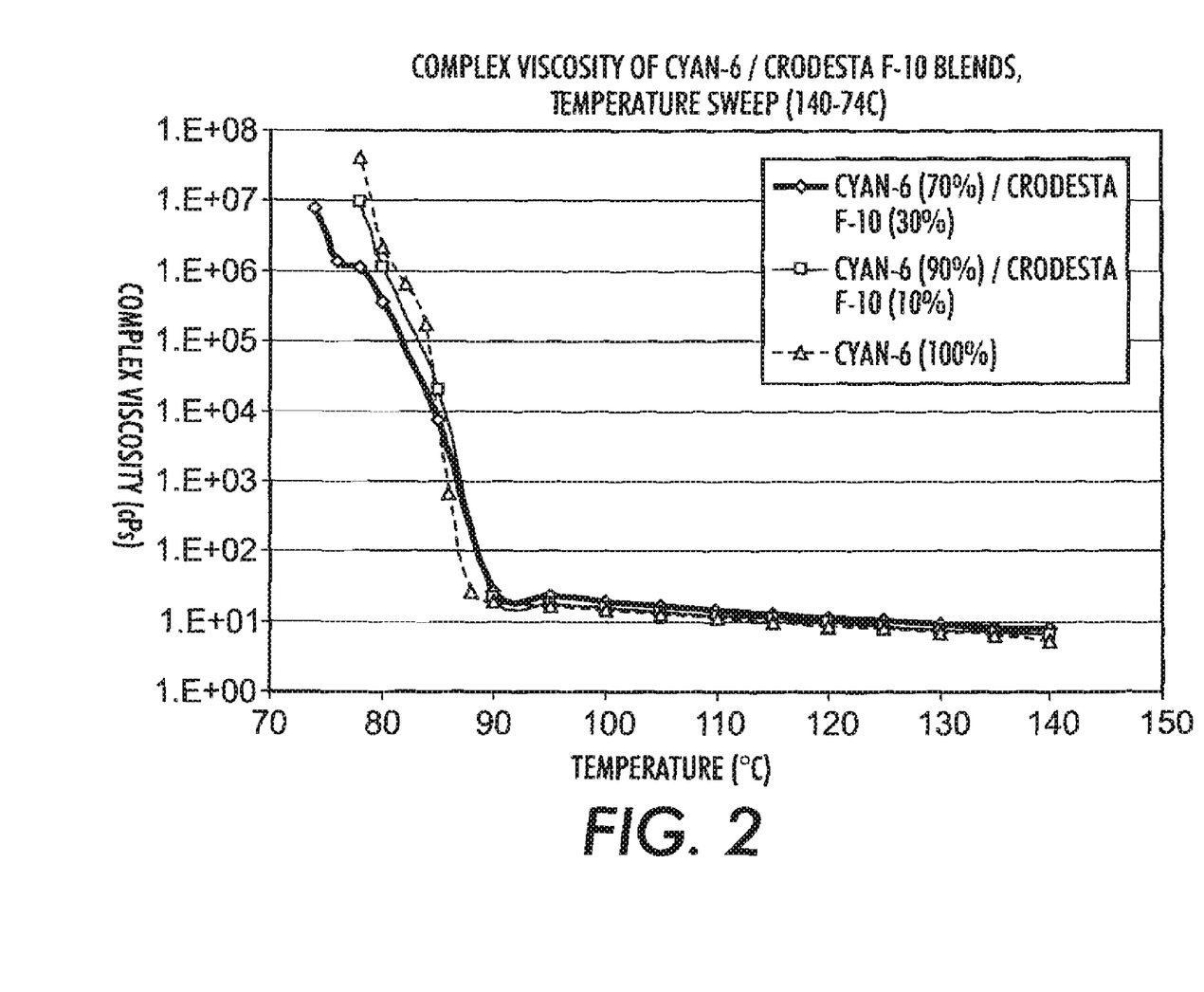
FIG. 2 is a graph showing complex viscosity of inks based on varying amounts of a component of Crodesta F-10 as a function of temperature according to Examples of the disclosure.

The temperature sweep data for the Control Ink 5 and the 10% and 30% Crodesta F-10 blends were also obtained to further demonstrate the suitability of the present solid ink, particularly for direct to paper printing. The results are shown in FIG. 2. The complex viscosities of inks containing Crodesta F-10 are lower at temperatures below about 80° C. Such characteristics may broaden the fusing latitude of solid ink images produced by direct to paper processes, thereby improving ink adhesion while reducing showthrough.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims. Unless specifically recited in the claim, steps or components of claims should not be implied or imported from the specification or any other claims as to any particular order, number, position, size, shape, angle, color, or material.

What is claimed is:

1. A solid phase change ink composition comprising an ink vehicle,
a colorant, and
at least one naturally derived material,
wherein the at least one naturally derived material is a blend of a glycerol ester of hydrogenated abietic (rosin) acid, present in an amount of from about 1 to about 20 percent by weight, a sucrose ester present in an amount of from about 1 to about 50 percent by weight, and a vegetable based amide compound present in an amount of from about 1 to about 40 percent by weight, and
the at least one naturally derived material is a low melt material having an onset of melting from about 45° C. to about 120° C., and a melt transition width of from about 3° C. to about 30° C.

2. The solid phase change ink composition according to claim 1, wherein the vehicle is present in an amount of about 60 to about 99.5 percent by weight of the solid phase change ink composition, and the colorant is present in an amount of about 0.5 to about 20 percent by weight of the ink vehicle.

3. The solid phase change ink composition according to claim 1, wherein the at least one naturally derived material is present in the ink vehicle in an amount of at least 20 percent by weight of the ink vehicle to about 95 percent by weight of the ink vehicle.

4. The solid phase change ink composition according to claim 1, wherein the sucrose ester is sucrose distearate.

5. The solid phase change ink composition according to claim 1, wherein the jetting temperature of the solid phase change ink is less than 145° C. and the melt viscosity is less than 30 cPs.

6. The solid phase change ink composition according to claim 1, wherein the jetting temperature of the solid phase change ink is from about 100-140° C. and the melt viscosity is from about 5-25 cPs.

7. The solid phase change ink composition according to claim 1, wherein the low melt material has an onset of melting at about 50-60° C.; and melt transition width of about 5-10° C.

8. The solid phase change ink composition according to claim 1, wherein the at least one vegetable based amide compound is stearamide or oleamide or ethylene bis-stearamide or mixtures thereof.

9. A method for making a solid phase change ink composition, comprising:
mixing at least one naturally derived material, an ink vehicle, and a colorant,
wherein the at least one naturally derived material is a blend of a glycerol ester of hydrogenated abietic (rosin) acid, present in an amount of from about 1 to about 20 percent by weight, a sucrose ester present in an amount of from about 1 to about 50 percent by weight, and a vegetable based amide compound present in an amount of from about 1 to about 40 percent by weight, and the at least one naturally derived material has a low melt material having an onset of melting of from about 45° C. to about 120° C., and a melt transition width of from about 3° C. to about 30° C.

10. The method of claim 9, wherein the vehicle is present in an amount of about 60 to about 99.5 percent by weight of the solid phase change ink composition, and the colorant is present in an amount of about 0.5 to about 20 percent by weight of the ink vehicle.

11. The method of claim 9, wherein at least one naturally derived material is present in the ink vehicle in an amount of at least 20 percent by weight of the ink vehicle to about 75 percent by weight of the ink vehicle.

12. The method of claim 9, wherein at least one naturally derived material is present in the ink vehicle in an amount of at least 30 percent by weight of the ink vehicle to about 60 percent by weight of the ink vehicle.

13. The method of claim 9, wherein the jetting temperature of the solid phase change ink is less than 145° C. and the melt viscosity is less than 30 cPs.

14. The method of claim 9, wherein the vegetable based amide compound is vegetable stearamide.

15. An ink jet device comprising at least one ink retaining reservoir holding a phase change ink, an ink jet head, and an ink supply line for providing the phase change ink to the ink jet head, wherein the phase change ink comprises an ink vehicle, a colorant, and at least one naturally derived material that comprises a blend of a glycerol ester of hydrogenated abietic (rosin) acid, present in an amount of from about 1 to about 20 percent by weight, a sucrose ester present in an amount of from about 1 to about 50 percent by weight, and a vegetable based amide compound present in an amount of from about 1 to about 40 percent by weight.

* * * * *